US010889368B2

(12) United States Patent
Le Borloch

(10) Patent No.: US 10,889,368 B2
(45) Date of Patent: Jan. 12, 2021

(54) DEVICE FOR MANAGING THE MECHANICAL ENERGY OF AN AIRCRAFT, HAVING A LIGHT SYSTEM, RELATED AIRCRAFT AND PROCESS

(71) Applicant: DASSAULT AVIATION, Paris (FR)

(72) Inventor: Jérôme Le Borloch, Boulogne (FR)

(73) Assignee: DASSAULT AVIATION, Paris (FR)

( * ) Notice: Subject to any disclaimer, the term of this patent is extended or adjusted under 35 U.S.C. 154(b) by 428 days.

(21) Appl. No.: 15/809,388

(22) Filed: Nov. 10, 2017

(65) Prior Publication Data
US 2018/0155008 A1 Jun. 7, 2018

(30) Foreign Application Priority Data

Nov. 14, 2016 (FR) ..................................... 16 01612

(51) Int. Cl.
| | | |
|---|---|---|
| B64C 13/04 | (2006.01) | |
| B64D 31/04 | (2006.01) | |
| B64D 45/00 | (2006.01) | |
| B64D 43/00 | (2006.01) | |
| G05G 1/04 | (2006.01) | |

(52) U.S. Cl.
CPC .......... *B64C 13/0425* (2018.01); *B64D 31/04* (2013.01); *B64D 45/00* (2013.01); *B64D 43/00* (2013.01); *G05G 1/04* (2013.01)

(58) Field of Classification Search
CPC ............ B64C 13/0425; B64C 13/0421; B64C 13/042; B64D 31/04; B64D 45/00; B64D 43/00; G05G 1/04
See application file for complete search history.

(56) References Cited

U.S. PATENT DOCUMENTS

| | | | |
|---|---|---|---|
| 2011/0238277 A1 | 9/2011 | Lacoste et al. | |
| 2015/0183511 A1* | 7/2015 | Ott ......................... | B64C 19/00 244/50 |
| 2015/0210383 A1 | 7/2015 | De Mers et al. | |
| 2018/0134403 A1* | 5/2018 | Granier ................. | B64D 31/14 |
| 2018/0134404 A1* | 5/2018 | Granier ................. | B64D 31/04 |

FOREIGN PATENT DOCUMENTS

FR 2958050 A1 9/2011

OTHER PUBLICATIONS

Corresponding Search Report for FR 1601612, Pub date Jul. 13, 2017.

* cited by examiner

*Primary Examiner* — Rodney A Bonnette
(74) *Attorney, Agent, or Firm* — Davidson, Davidson & Kappel, LLC

(57) ABSTRACT

A device for managing the mechanical energy of an aircraft, having a light system, includes a support defining a guide; at least one control lever for varying the mechanical energy of the aircraft, mounted moving through the guide; and at least one position sensor detecting the position of the control lever in the guide, configured to create position information for the position of the control lever in the guide intended to be sent to a flight control unit of the aircraft. The device also includes at least one light strip extending on the support along at least part of the travel of the control lever in the guide; and a control unit of the at least one light strip, configured to display at least one light indication at least at one given point of the lighted position ramp calculated as a function of a movement context of the aircraft.

19 Claims, 8 Drawing Sheets

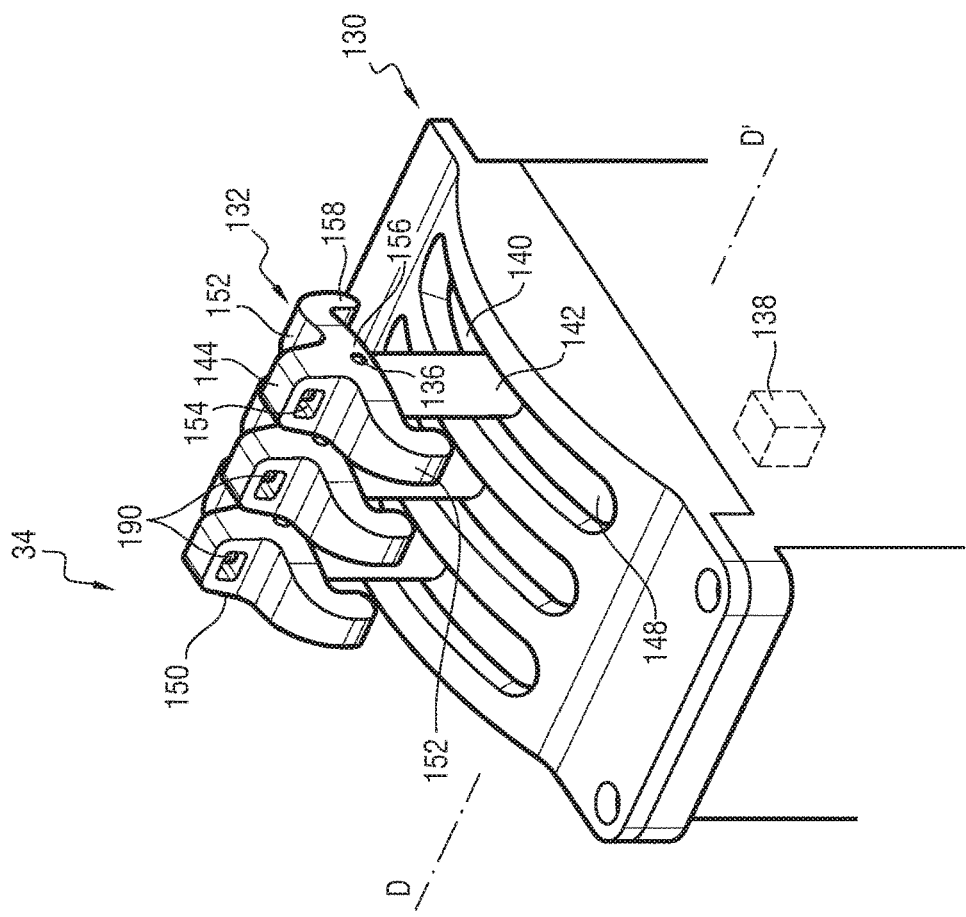
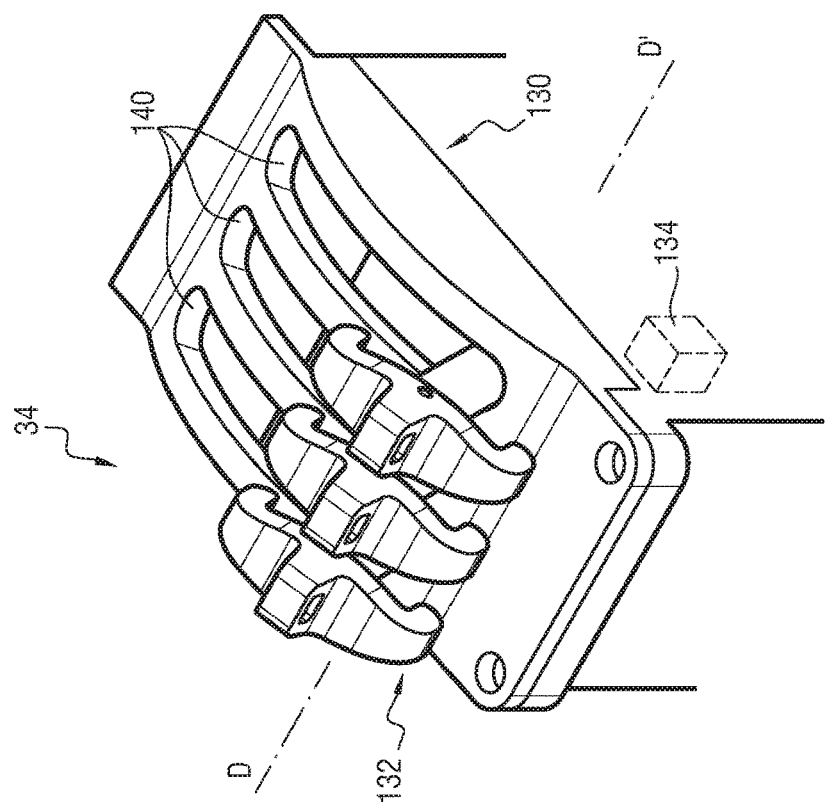

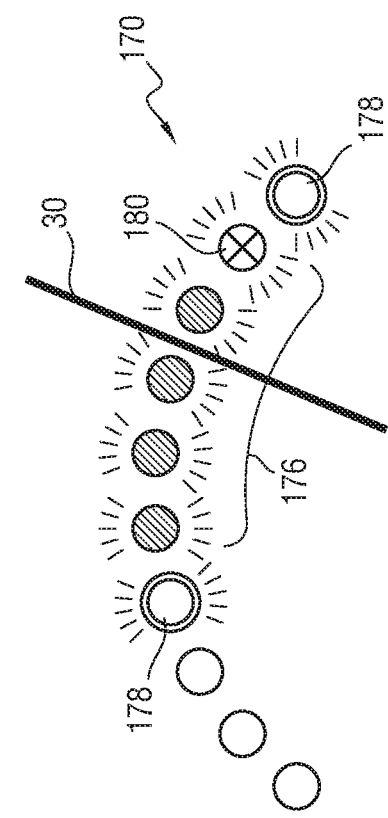
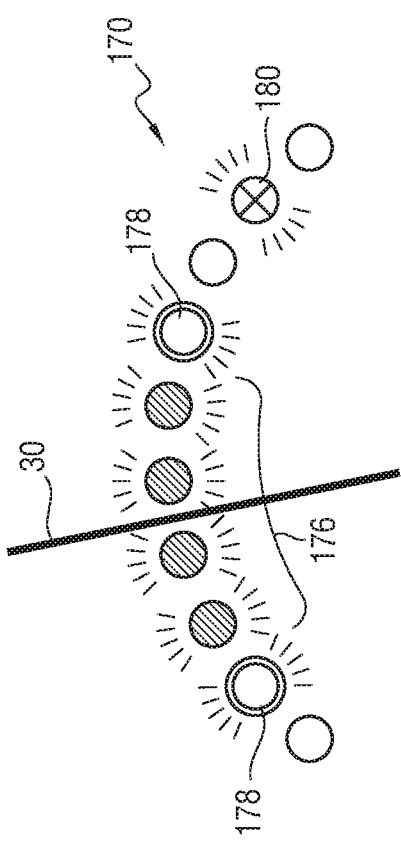
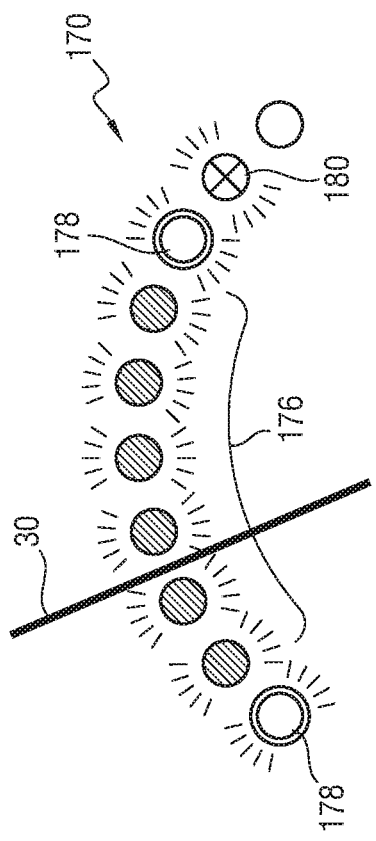

DEVICE FOR MANAGING THE MECHANICAL ENERGY OF AN AIRCRAFT, HAVING A LIGHT SYSTEM, RELATED AIRCRAFT AND PROCESS

This claims the benefit of French Patent Application FR 16 01612, filed Nov. 14, 2016 and hereby incorporated by reference herein.

The Detailed Description and drawings of the present application were also filed in a U.S. patent application identified by entitled DEVICE FOR MANAGING THE MECHANICAL ENERGY OF AN AIRCRAFT, HAVING AN ENERGY MANAGEMENT AUXILIARY SYSTEM, RELATED AIRCRAFT AND PROCESS, filed on the same date as the present application, and in a U.S. patent application identified by entitled DEVICE FOR MANAGING THE MECHANICAL ENERGY OF AN AIRCRAFT, WITH A FORCE APPLICATION SYSTEM ON A CONTROL LEVER, RELATED AIRCRAFT AND PROCESS, filed on the same date as the present application.

The present disclosure relates to a device for managing the mechanical energy of an aircraft, intended to be placed in a cockpit of the aircraft, comprising:
- a support defining a guide;
- at least one control lever for controlling a mechanical energy variation of the aircraft, mounted moving through the guide;
- at least one position sensor detecting the position of the moving lever in the guide, able to create position information for the position of the moving lever in the guide intended to be sent to a flight control unit of the aircraft.

The cockpit of the aircraft is for example situated in the aircraft, in the front thereof, or on the ground, in a control booth separated from the aircraft or in a stimulator.

Such a device is in particular intended to facilitate piloting of the propulsion axis of the aircraft, while simplifying the pilot's task.

BACKGROUND

Generally, in aircrafts, the propulsion axis is piloted by several controls, in particular the throttle corresponding to each motor, and by controls controlling the members for modifying the energy of the aircraft, such as the air brakes and the foil flaps.

To modify the total mechanical energy of the aircraft, the pilot can act on the throttles. However, he can only view the result of his set-point in terms of acceleration and gradient once the motor speed has stabilized.

Furthermore, the perception of the variation of mechanical energy available in the aircraft at a given moment resulting from the available thrust or braking controls is delicate, and is only obtained indirectly, for example by observing the motor speed percentage on a display in the cockpit.

To offset this problem, U.S. Pat. No. 8,527,173 describes a device for managing the total energy of an aircraft in which a lever can be used to adjust an energy variation of the aircraft, comparable to a pseudo-total gradient of the aircraft.

Based on the energy variation control signal sent to the flight control unit, the latter adjusts the motor speed of each motor and the drag to reach the adjusted energy variation.

Furthermore, a possible energy variation scale is displayed in the form of a pseudo-total slope scale on a display of the aircraft. This scale is bounded upwardly and downwardly, respectively, by the maximum and minimum energy variation values that can be achieved by the aircraft, allowing the pilot to evaluate the operational situation on the propulsion axis and the energy variation availability.

SUMMARY OF THE INVENTION

This visual information is very useful for the pilot. However, in some operational situations, in particular when the pilot must control other flight parameters, he cannot concentrate directly on a scale displayed on a viewer.

One aim of the invention is therefore to provide a management device that has, at all times, an indicator of the airplane's situation in terms of propulsion in its capacity range, when the pilot is unable to carefully observe a display in the cockpit.

To that end, device at the aforementioned type is provided, characterized in that it includes:
- at least one light strip extending on the support along at least part of the travel of the moving lever in the guide;
- a control unit of the light strip, able to display at least one light indication at least at one given point of the lighted position ramp calculated as a function of a movement context of the aircraft.

The device may comprise one or more of the following features, considered alone or according to any technically possible combination:
- the control unit is able to display a first light indication at a first point of the light strip and at least one second light indication, separate from the first light indication, at a second point of the light strip;
- the first light indication and the second light indication are with different colors, intensities or sequences;
- the control unit is able, in a first movement context of the aircraft, to place the light indication at least at one given point of the light strip, and in a second movement context of the aircraft, to place the light indication at least at one other given point of the light strip;
- the movement context of the aircraft comprises the mechanical energy variation of the aircraft;
- the light indication is arranged across from a force change in the movement travel of the moving lever in the guide, in particular across from an indentation and/or a stop;
- the light indication extends over a segment of the light strip comprising the given point;
- the light strip extends along the guide parallel to the guide;
- the light strip comprises a plurality of successive light sources, each light source being controlled individually by the control unit of the light strip.

An aircraft is also provided comprising:
- a plurality of sources for varying the mechanical energy of the aircraft comprising at least one propulsion motor and at least one member for modifying the energy of the aircraft;
- a flight control unit,
- a device as previously described, the position sensor detecting the position of the moving lever being connected to the flight control unit, the flight control unit being able to pilot at least one propulsion motor and/or at least one member for modifying the energy based on the position information of the moving lever in the guide.

The aircraft may comprise one or more of the following features, considered alone or according to any technically possible combination:

the flight control unit is able to calculate, at each moment, the position of the given point as a function of the movement context of the aircraft at that moment, and to send the calculated position to the control unit;

the moving lever is a centralized control lever able to jointly pilot at least two mechanical energy variation sources of the aircraft from among the plurality of mechanical energy variation sources of the aircraft as a function of the position information of the centralized control lever in the guide, the movement context of the aircraft comprising the mechanical energy variation of the aircraft.

at least one first source piloted by the flight control unit based on position information of the centralized control lever being a motor, at least one second source piloted by the flight control unit jointly with the first source based on the position information of the centralized control lever being a member for modifying the mechanical energy of the aircraft;

A method for controlling an aircraft is also provided, comprising the following steps:

providing a device as defined above;

calculating the position of a given display point of a lighted indicator on the light strip as a function of a movement context of the aircraft, displaying, via the control unit, the light indication at least at the given point of the light strip calculated in the calculating step.

The method may comprise one or more of the following features, considered alone or according to any technically possible combination:

the display, by the control unit, of a first light indication at a first point of the light strip and the display, by the control unit, of at least one second light indication, separate from the first light indication, at a second point of the light strip;

in a first movement context of the aircraft, placing the light indication at least at one given point of the light strip, and in a second movement context of the aircraft, placing the light indication at least at one other given point of the light strip.

BRIEF SUMMARY OF THE DRAWINGS

The invention will be better understood upon reading the following description, provided solely as an example and done in reference to the appended drawings, in which:

FIGS. 5 and 6 illustrate individual control levers of each motor, intended to supplement the centralized control lever in case of operating defect of the centralized control lever;

FIGS. 12 to 14 illustrate different display configurations of an light indication on the light strips.

DETAILED DESCRIPTION

Figure 1:
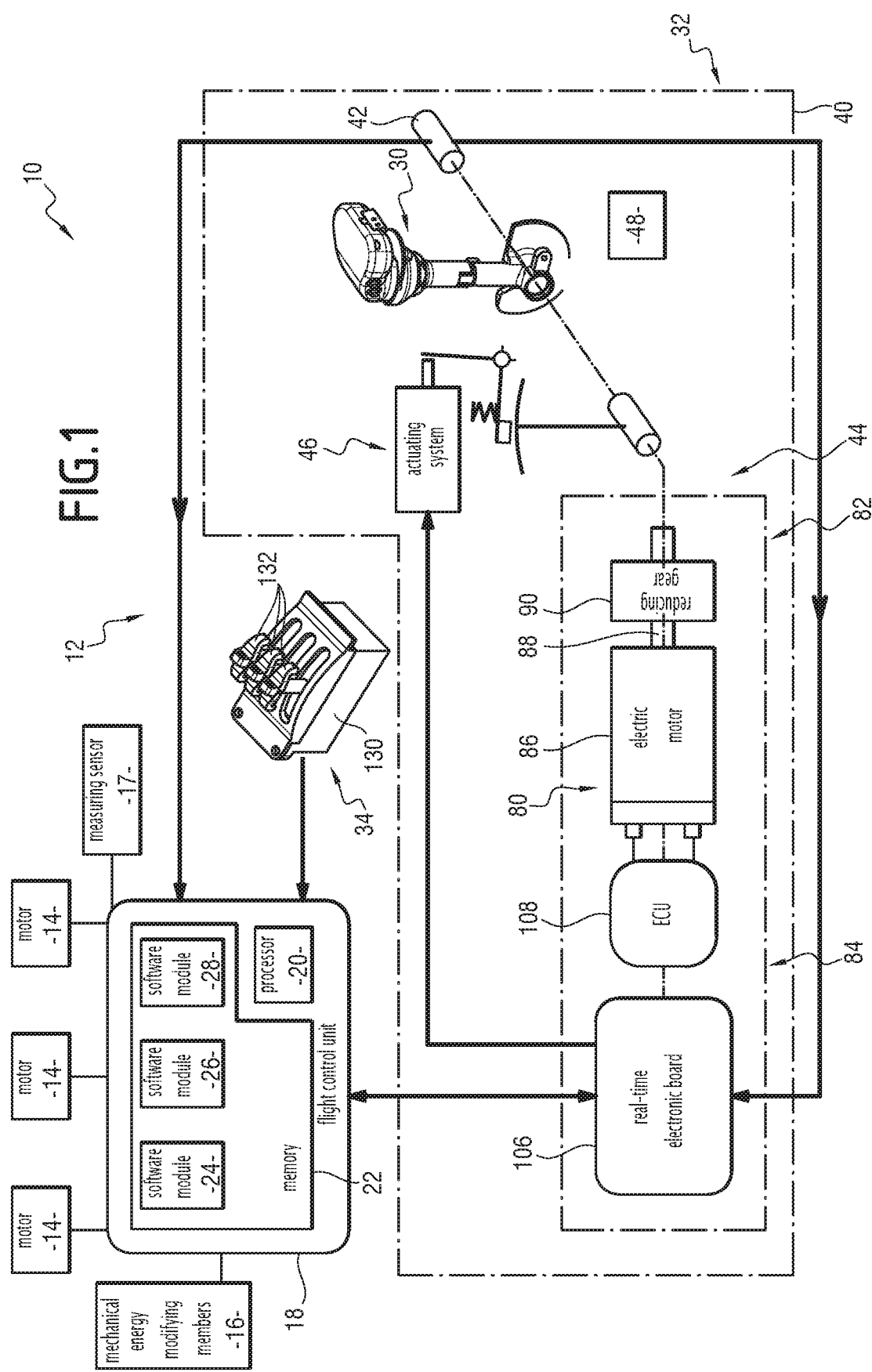
FIG. 1 is a block diagram schematically showing an aircraft provided with a first energy management device according to an embodiment of the invention.

A first aircraft 10 provided with a mechanical energy management device 12 according to an embodiment of the invention is illustrated by FIG. 1.

Aside from the mechanical energy management device 12, the aircraft 10 includes several propulsion motors 14, members 16 for modifying the mechanical energy of the aircraft 10, sensors 17 for measuring flight parameters, and a flight control unit 18, able to control each of the motors 14 and the mechanical energy modifying members 16.

Each propulsion motor 14 is able to be controlled by the flight control unit 18, to cause a thrust force on the aircraft 10 to change, increasing or decreasing the total mechanical energy of the aircraft 10.

The mechanical energy modifying members 16 are advantageously members for modifying the drag of the aircraft 10. They for example include air brakes and/or deployable foil flaps. Each member for modifying the mechanical energy is able to be controlled by the flight control unit 18, to cause a drag force on the aircraft 10 to change, decreasing or increasing the total mechanical energy of the aircraft 10.

Each propulsion motor 14 and each member for modifying the mechanical energy 16 therefore make up a mechanical energy variation source of the aircraft 10.

The flight parameter measuring sensors 17 are in particular able to determine the position, the altitude, the air and ground speeds, and the air and ground gradients.

The flight control unit 18 includes at least one processor 20, and a memory 22 containing a plurality of software modules 24 to 28 capable of being executed by the processor 20.

The memory 22 in particular contains a module 24 for developing control signals of the motors 14 and control signals of the members for modifying the mechanical energy 16.

It advantageously contains a module 26 for calculating a property representative of the mechanical energy variation of the aircraft based on flight parameters.

It further contains a module 28 for controlling the position of a moving lever 30 of the energy management device 12, able to define a position of the moving lever 30 representative of the situation of the aircraft 10 in its range of energy variation capacities.

The module 24 for developing control signals is able to calculate the control signals of the motors 14 and of the energy modifying members 16 based on a set point received from the energy management device 12, when the aircraft 10 is in manual piloting mode, or based on a set point received from an automatic piloting system, when the aircraft 10 is an automatic piloting mode.

The module 26 for calculating the property representative of the mechanical energy variation is for example able to calculate a current mechanical energy variation of the aircraft and a range of mechanical energy variations that can be achieved by the aircraft 10 at each moment, based on flight parameters obtained from the sensors 17, and the operational situation of the aircraft.

The operational situation of the aircraft 10 in particular includes the movement of the aircraft 10 on the ground or in flight and the available equipment, in particular the number of motors 14, the individual thrust developed by each motor 14, the number of mechanical energy modifying members 16 and the position of each mechanical energy modifying member 16.

The property representative of the mechanical energy variation is for example a pseudo-total gradient, as calculated in U.S. Pat. No. 8,527,173 by the Applicant, the details of the calculation of U.S. Pat. No. 8,527,173 being hereby incorporated by reference herein. This pseudo-total gradient is defined as the ground gradient, which, under current conditions, leads to a constant conventional speed.

This pseudo-total gradient γ* is for example calculated using the following formula:

$$\gamma^* = \gamma_{sol} + \frac{\left(\frac{\partial V_{air}}{\partial V_c}\right)_{z=cste}}{1+\frac{V_{sol}}{g}\cdot\left(\frac{\partial V_{air}}{\partial z}\right)_{V_c=cste}} \frac{\dot{V}_c}{g} = \gamma_{sol} + K\cdot\frac{\dot{V}_c}{g}$$

where $\gamma_{sol}$ is the ground gradient of the aircraft 10, $V_{sol}$ is the speed of the aircraft 10 relative to the ground, $V_{air}$ is the airspeed of the aircraft 10, $V_C$ is the conventional speed of the aircraft 10, g is the gravitational acceleration, and z is the altitude of the aircraft 10.

As will be seen below, the module 28 for controlling the position of the moving lever 30 is able to develop a position control signal of the moving lever 30 as a function of the current mechanical energy variation, and the range of mechanical energy variations that can be achieved by the aircraft 10.

The calculated position of the moving lever 30 reflects the current mechanical energy variation of the aircraft 10 in the range of mechanical energy variations that can be achieved by the aircraft 10. This position is referred to as a "movable neutral" position, and varies over time, without user intervention depending on the movement configuration of the aircraft 10, in the automatic piloting mode.

The bounds of the range of mechanical energy variations that can be achieved also vary over time as a function of the situation of the aircraft (in particular position, speed, attitude, available thrust, available drag, etc.).

The maintaining of the current mechanical energy variation of the aircraft 10, and therefore the movable neutral position, is advantageously enslaved by the automatic piloting system in automatic pilot mode.

The mechanical energy variation of the aircraft 10 can also be adjusted manually by the pilot by shifting the moving lever 30 away from the movable neutral position to define a new desired mechanical energy variation set point of the aircraft 10, in the range of mechanical energy variations able to be achieved by the aircraft 10.

Each position of the moving lever 30 then corresponds to a mechanical energy variation setpoint value of the aircraft 10.

Figure 2:
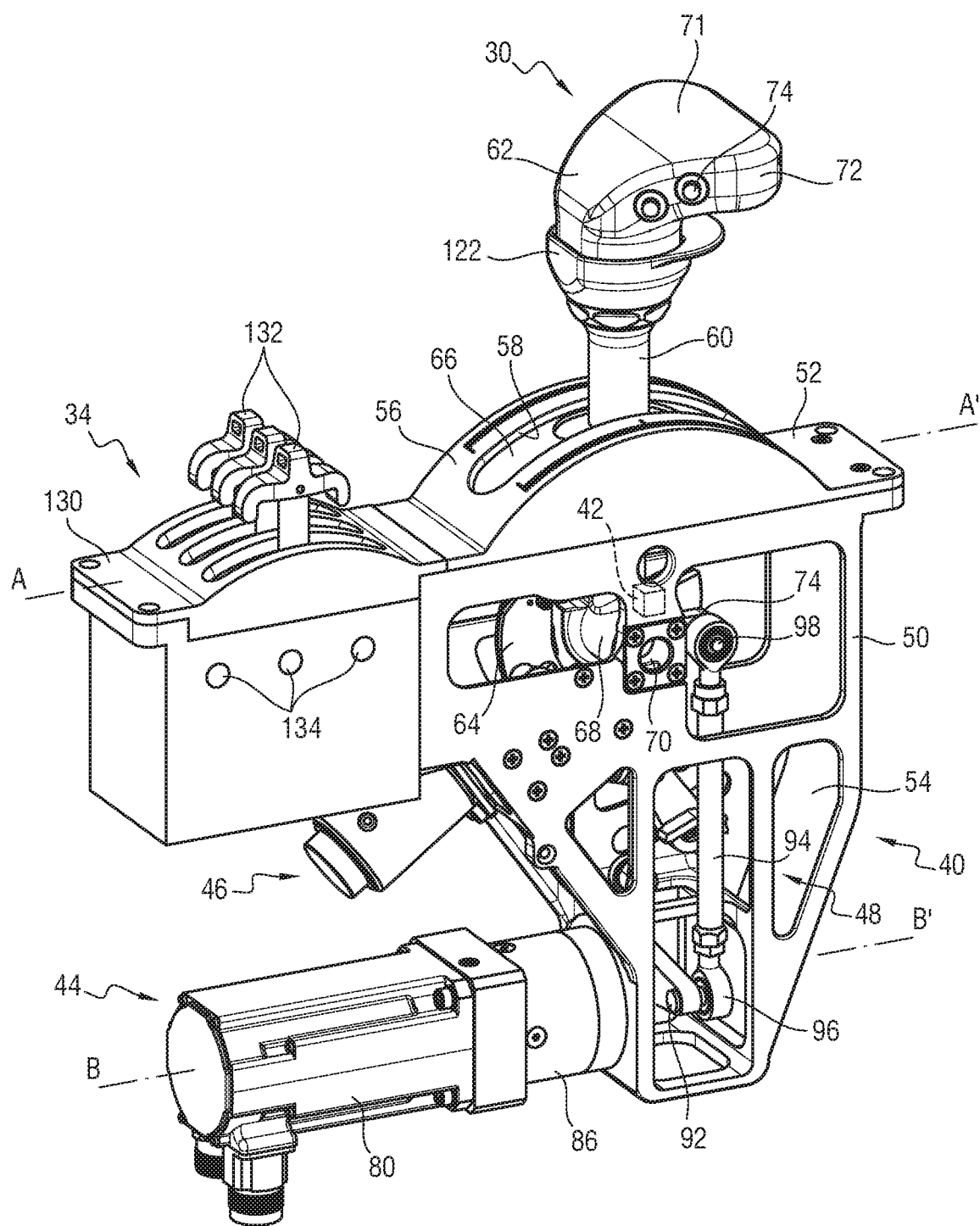
FIG. 2 is a three-quarters front perspective view of the main elements of the energy management device of FIG. 1, including a centralized control lever for the total mechanical energy of the aircraft and an active system for applying a force on the centralized control lever, as well as individual levers.
Figure 8:
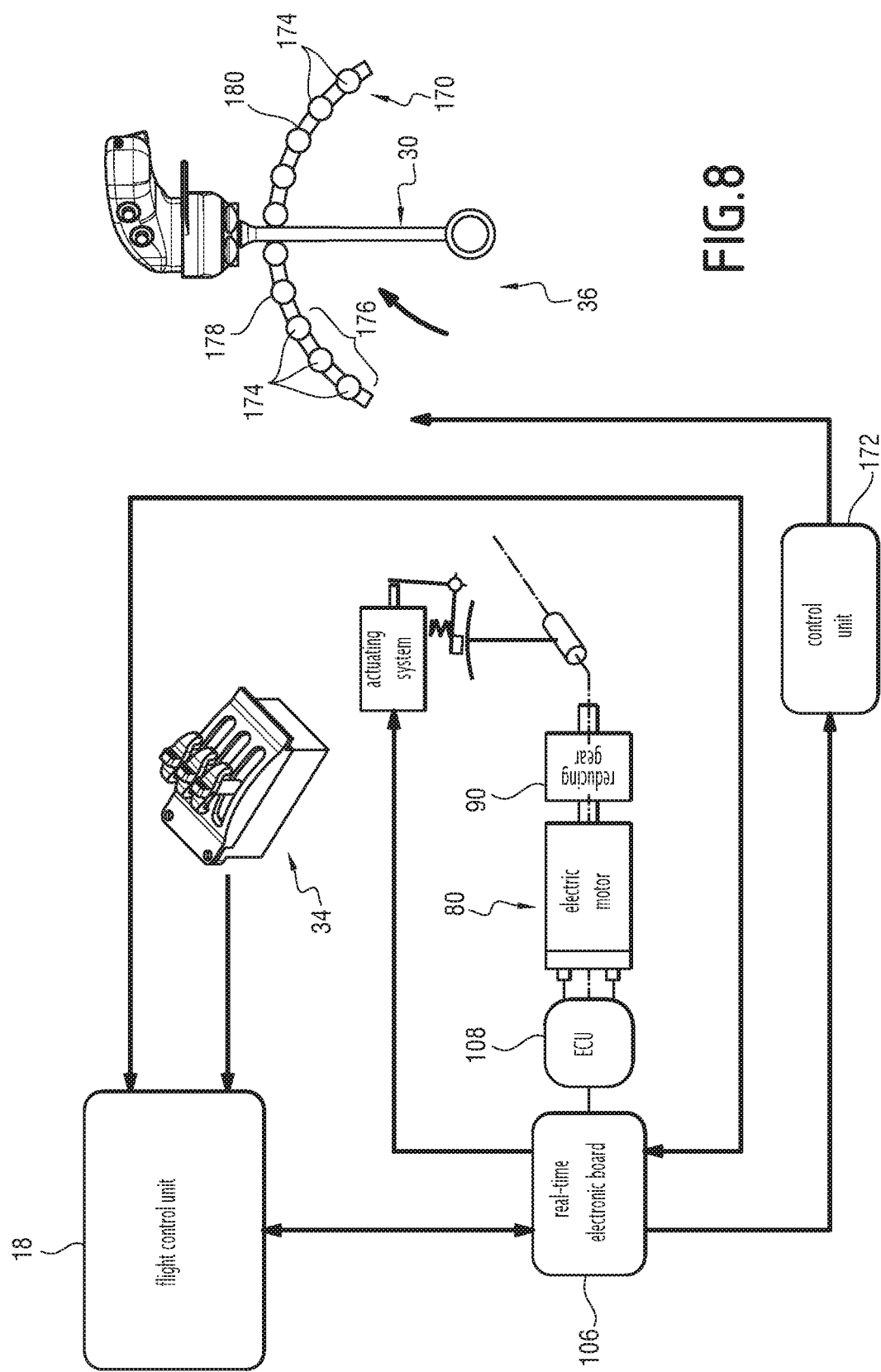
FIG. 8 is a block diagram similar to that of FIG. 1, illustrating the control of the light strips of FIG. 7.

In reference to FIGS. 1 and 2, the energy management device 12 includes a main energy management system 32 comprising the moving lever 30, an auxiliary individual control system 34 of the motors 14, able to be used by the user if the moving lever 30 fails, and an illuminated display system 36, visible in FIG. 8, able to provide light indications to the user of the moving lever 30.

In reference to FIG. 2, the main energy management system 32 includes a support 40, intended to be fixed in the cockpit of the aircraft 10, the moving lever 30, mounted moving in the support 40, and at least one position sensor 42, intended to measure the position of the moving lever 30 relative to the support 40.

The main energy management system 32 further includes an active system 44 for applying a force on the moving lever 30, piloted by the flight control unit 18, and advantageously an auxiliary assembly 46 for applying a mechanical force on the moving lever 30, able to operate in case of malfunction of the active system 44.

Advantageously, the main energy management system 32 further includes a surpassable mechanical stop system 48.

The support 40 is able to be placed in the cockpit of the aircraft 10, preferably between the seats of the cockpit, in the central pylon.

As illustrated by FIG. 2, the support 40 includes an open-worked base 50, and an upper cover 52 mounted on the base 50, through which the moving lever 30 is engaged.

The base 50 defines an inner volume 54, through which a lower part of the moving lever 30 is inserted.

The upper cover 52 upwardly closes the base 50. Here, it has an upwardly curved upper surface 56. It defines a longitudinal guide 58 for guiding the movement of the moving lever 30.

The moving lever 30 is a centralized control lever that is able to control a mechanical energy variation of the aircraft 10, without piloting one particular motor 14 of the aircraft 10 individually. The position of the moving lever 30 in the guide 58 measured by the position sensor 42 is transmitted to the flight control unit 18 to generate a control signal acting jointly on several motors 14 of the aircraft and/or on the energy modifying members 16.

In reference to FIG. 2, the moving lever 30 includes a rod 60 engaged through the guide 58, a head 62 mounted at the upper end of the rod 60 to be grasped by the hand of a user of the device 12, and a sector 64, secured to the lower end of the rod 60, in the inner volume 54.

In this example, the moving lever 30 further includes sliding flaps 66 closing off the guide 58, to prevent objects from passing through the guide 58 toward the inner volume 54.

In the example shown in FIG. 2, the rod 60 has, at its lower end, a horizontal bush 68 receiving a horizontal rotation axis 70 of the moving lever 30, perpendicular to the longitudinal axis A-A' of the guide 58.

The head 62 protrudes forward at the upper end of the rod 60. It defines an upper bearing surface 71 for the palm of the user's hand and a lower grasping surface 72 by the user's fingers. Here, it is provided with control buttons 74, for example for airbrake controls, or the flight mode.

The sector 64 is mounted on the lower end of the rod 60, around the axis 70. It extends in a plane perpendicular to the axis 70.

As will be seen below, it is able to cooperate mechanically with the auxiliary end 46 for applying a mechanical force, in case of failure of the active application system 44.

The bush 68 has a radial finger 74 protruding transversely relative to the axis 70 to cooperate with the active system 44 for applying a force on the moving lever 30.

The moving lever 30 is thus rotatable around the axis 70 in the guide 58 between a rear extreme position and a forward extreme position.

The position sensor 42 is able to determine information relative to the angular position of the moving lever 30 around the axis 70, and to send this signal to the flight control unit 18.

The active system for applying a force 44 includes an actuator 80, and a mechanism 82 for transmitting movement between the actuator 80 and the moving lever 30. It comprises a control unit 84 of the actuator 80, visible in FIG. 1, connected to the flight control unit 18, to control the force applied on the moving lever 30 and the movement of the moving lever 30 in the guide 58.

The actuator 80 here includes an electric motor 86, provided with an output shaft 88 rotating around a motor axis B-B.

The motor 86 is preferably a brushless motor. It is electrically connected to the control unit 84 of the actuator 80, which controls the rotation of the shaft 88 in one direction or the other around the axis B-B'.

In reference to FIGS. 1 and 2, the transmission mechanism 82 advantageously includes a reducing gear 90, mounted at the output of the shaft 88, a finger 92 rotating jointly with the output of the reducing gear 90 around the axis B-B', and a transmission connecting rod 94, inserted between the rotating finger 92 and the radial finger 74 of the sector 64 of the moving lever 30.

The connecting rod 94 has a first end 96 articulated upstream on the rotating finger 92, and a second end 98 articulated downstream on the radial finger 74. It is able to convert and transmit the rotational movement generated by the motor 80 on the shaft 88 around the axis B-B' into a rotating movement of the moving lever 30 around its axis 70.

The presence of a transmission mechanism 82 provided with a connecting rod 94 provides a very flexible movement without mechanical play of the moving lever 30. Furthermore, the positioning of the motor 86 relative to the lever 30 is freer than in a system comprising gears, which optimizes the available space to position the device 12.

The control unit 84 of the actuator 80 is able to receive, in real-time, the control signals developed by the control module 28 of the position of the moving lever 30, and to transcribe these control signals into a movement of the moving lever 30 in the guide 58.

In particular, the control unit 84 is able to pilot the actuator 80 to generate a force shifting the moving lever 30 between its rear extreme and forward extreme positions, following the calculated movable neutral position, in the absence of action by the user on the moving lever 30. This force in particular depends on the position of the moving lever 30 in the guide 58.

The control unit 84 is further able to create a force applied on the moving lever 30 when the user grasps the moving lever 30 and moves it around its axis 70 to pilot the mechanical energy variation of the aircraft 10 manually.

The applied force controlled by the control unit 84 depends on the position of the moving lever 30 between its rear extreme position and its forward extreme position. It also depends on the movement context of the aircraft 10, and the available energy variation in the aircraft 10, as calculated by the module 26.

In particular, the control unit 84 is able to generate variable force profiles during the shifting of the moving lever 30 around its axis 70. Examples of variable profiles as a function of the angular position P of the moving lever 30 are shown in FIGS. 9 to 11.

Figure 9:
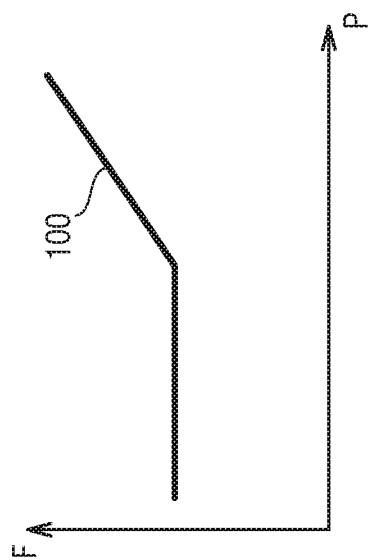

In the example of FIG. 9, the variable profile comprises a ramp 100, the applied force having an increasing intensity when the moving lever 30 moves toward its forward extreme position.

Figure 10:
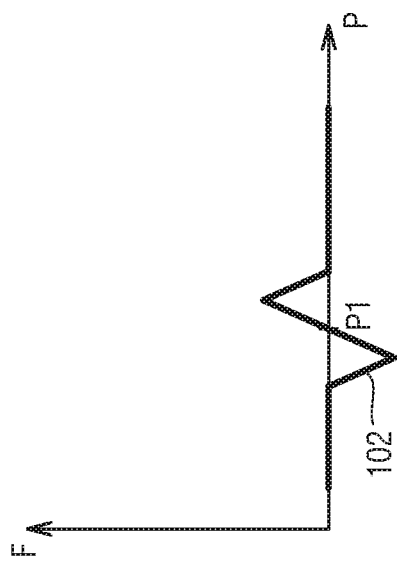
FIGS. 9 to 11 illustrate various force profiles that can be applied on the centralized control lever based on the position of the centralized control lever by the active application system.

In the example of FIG. 10, the variable profile comprises a stable detent 102 around a given position P1 between the rear extreme position and the forward extreme position. Once switched into the stable detent 102, the moving lever 30 is able to remain in this position, since the user must cross a wall in the forward or rear direction to leave this position.

Figure 11:
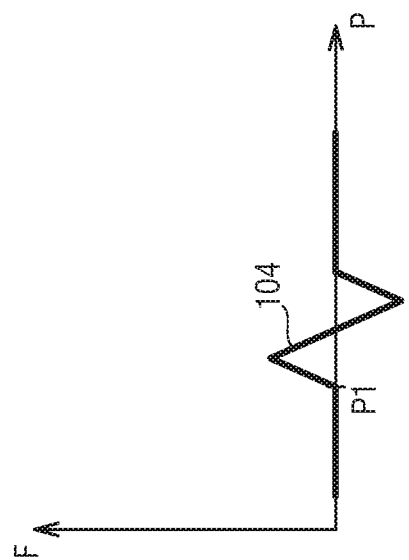

In the example of FIG. 11, the variable profile comprises an unstable detent 104, in position P1, in which the user must cross a wall to pass position P1, without being able to remain stably in this position.

The control unit 84 is able to adapt the force profile generated on the moving lever 30 at any moment, for example the intensity of the ramps 100, and/or the position, the intensity/height, and/or the nature of the detents 102, 104 as a function of the control signals received from the flight control unit 18, and the position of the moving lever 30.

In the embodiment of FIG. 1, the control unit 84 includes a real-time electronic board 106, connected to the flight control unit 18, and an electronic control unit (ECU) of the motor 108 inserted between the real-time electronic board 106 and the electric motor 86.

The real-time electronic board 106 for example includes a processor and a memory, having modules for transcribing control signals received from the unit 18 into corresponding force profiles to be applied on the moving lever 30. The electronic control unit of the motor 108 is able to create electric control pulses, based on the raw order received from the board 106.

It is electrically connected to the motor 86 to send the generated pulses to the motor 86.

The auxiliary assembly 46 for applying a mechanical force on the moving lever 30 is intended to offset a defect of the active system for applying a force 44, for example in the absence of power supply of the active system for applying a force 44. It is able to switch between a deactivated configuration when the active system for applying a force 44 is active and an active configuration, when the active system for applying a force 44 is deactivated.

Figure 4:
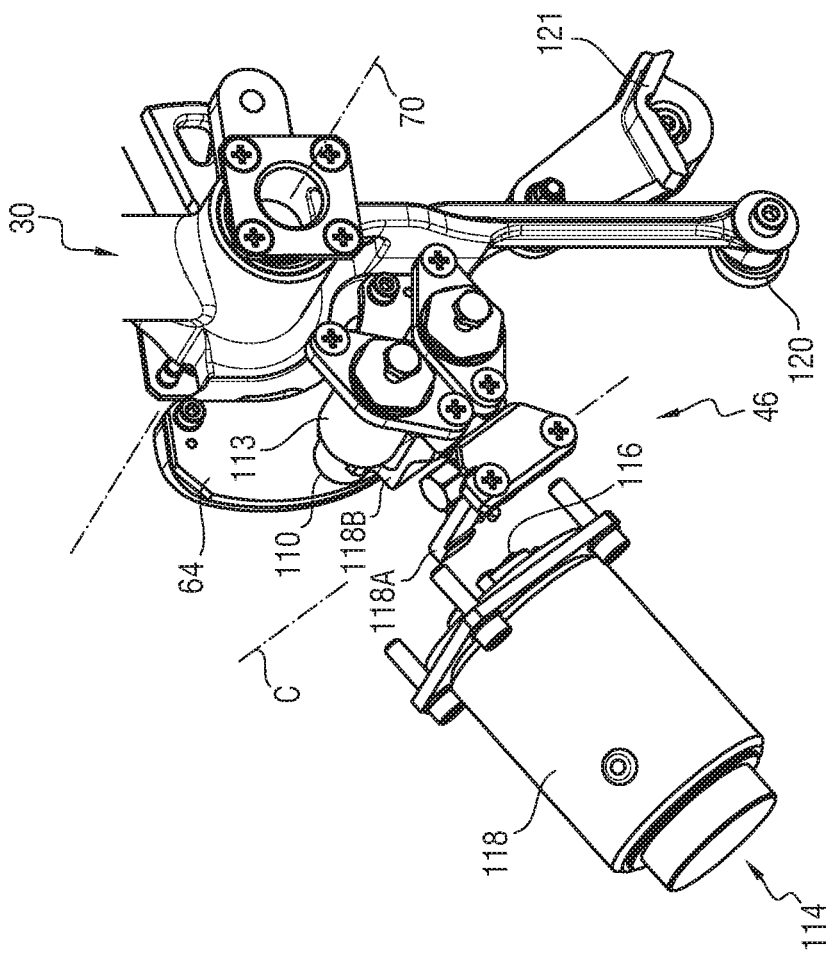
FIGS. 3 and 4 illustrate an assembly for applying a mechanical backup force on a centralized control lever of the energy management device of FIG. 1.
Figure 3:
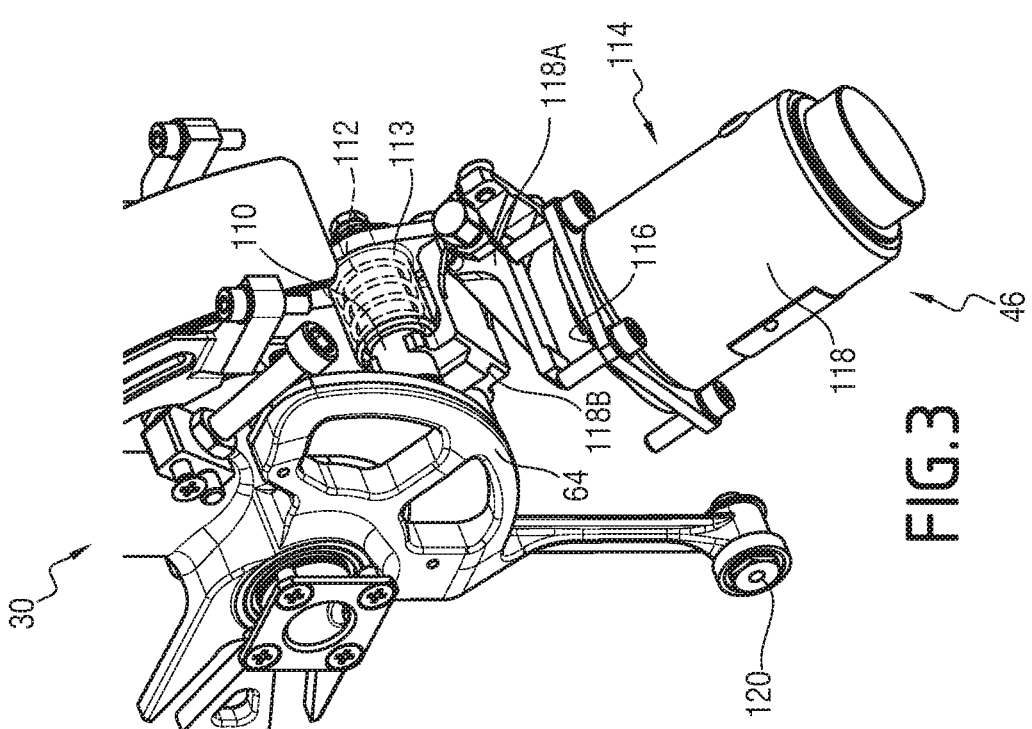

In reference to FIGS. 3 and 4, the auxiliary assembly 46 includes at least one pad 110 for mechanical cooperation with the moving lever 30, movable between a position engaged on the moving lever 30, in the active configuration of the auxiliary assembly 46 and a position disengaged from the moving lever 30 in the deactivated configuration of the auxiliary assembly 46.

The auxiliary assembly 46 further includes a member 112 for elastically biasing each pad 110 toward its engaged position, and an actuating system 114 able to keep the pad 110 in the disengaged position, against the elastic biasing member 112.

The pad 110 is mounted translatably along an axis parallel to the rotation axis 70 of the moving lever 30, in a cylinder 113 mounted fixed relative to the support 40, between the engaged position and the disengaged position.

In its engaged position, the pad 110 presses on a side surface of the sector 64 of the moving lever 30, thus generating a friction force between the pad 110 and the moving lever 30. In its released position, the pad 110 has been moved away from the side surface of the sector 64, and no longer mechanically cooperates with the moving lever 30.

The elastic biasing member 112 is housed in the sleeve 113 between the sleeve 113 and the pad 110. By default, it is able to stress the pad 110 toward its engaged position. It is for example formed by a helical spring.

The actuating system 114 includes a moving rod 116, and an element 118 for moving and maintaining the rod 116 in a deployed position. It further includes a rotary lever 118A and a prong 118B connecting the lever 118A to the pad 110.

The lever 118A is mounted pivoting relative to this support 40 around an axis C-C' perpendicular to and not secant with the rotation axis 70 of the moving lever 30.

The prong 118B is articulated at a first end on the lever 118A. It is received at a second end in a housing of the pad 110.

In the presence of a power supply of the moving and maintaining element 118, the rod 116 in its deployed position is able to cooperate with the lever 118A to keep the pad 110 in its disengaged position against the elastic biasing force generated by the elastic biasing member 112, using the prong 118B.

When there is no power supply for the moving and maintaining element 118, the rod 116 retracts, and no longer cooperates with the lever 118A. The elastic biasing member 112 then deploys the pad 110 outside the chamber 113 and then presses the pad 110 against the sector 64 of the moving lever 30.

The mechanical stop system 48 includes a stop 120 moving jointly with the moving lever 30 and a switch 121 secured to the support 40 to cooperate mechanically with the stop 120 in an intermediate position of the moving lever 30 between the forward extreme position and the rear extreme position.

In reference to FIG. 4, the mechanical stop system 48 further includes a second mechanical stop for passing in a rear sector of the travel, and a control 122 for passage of the second stop, visible in FIG. 2, for example an unlocking vane mounted moving on the rod 60 of the control stick 30 below the head 62.

The mechanical stop system 48 is thus able to embody particular control regions of the moving lever 30, between the intermediate position and the rear extreme position of the moving lever 30, for example a control zone of the thrust reversers.

The auxiliary system 34 for individual control of the motors 14 is illustrated by FIGS. 2, 5 and 6.

As illustrated by these figures, it is mounted adjacent to the main energy management system 32, for example behind the latter, in the longitudinal extension of the support 40.

The auxiliary control system 34 includes an auxiliary support 130, and a plurality of individual control levers 132 of each motor 14. It also includes, for each control lever 132, one or several additional sensors 134 detecting the position of the individual control lever 132.

Advantageously, the auxiliary control system 34 further includes a cooperation mechanism 136 between the individual control levers 132 (visible in FIG. 6), and an auxiliary mechanical stop system 138 on each individual control lever 132.

In this example, the additional support 130 includes, for each individual control lever 132, a guide 140 for the movement of the lever 132.

The guides 140 extend parallel to a same longitudinal direction shared with that of the guide 58. They are adjacent to one another.

Each individual lever 132 includes a rod 142 and a head 144, mounted at an upper end of the rod 142. Each individual lever 132 further advantageously comprises a protective flap 148 closing off the guide 140.

In reference to FIG. 6, the head 144 includes a central body 150, mounted on the upper end of the rod 142, and longitudinal grasping fingers 152, protruding longitudinally in front of and behind the central body 150.

The central body 150 protrudes upward relative to the finger 152. It defines an axial housing 154 for receiving a light indicator and side housings 156 for receiving a cooperation mechanism 136.

Each finger 152 has an end 158 in the form of a hook oriented downward. This end 158 is easy to grasp by the finger of a user inserted below the hook 158 either to lift the individual lever 132, or to move it forward or backward.

In this example, the individual lever 132 is mounted rotating around an axis D-D' parallel to the rotation axis 70 of the moving lever 30, between a punctual rear position in the guide 140, a plurality of intermediate positions in the guide 140, between two stops of the auxiliary stop system 138, and a punctual forward position.

In the punctual forward position and the punctual rear position, each individual lever 132 is blocked in rotation around its axis D-D' by a stop. Each individual lever 132 is able to be moved upward along the axis of its rod 142 to pass the stop and reach an intermediate position.

In the forward punctual position, each individual lever 132 then occupies an idle position, in which the motor 14 associated with the individual lever 132 is controlled by the flight control unit 18 jointly with the other motors 14, based on the position of the moving lever 30, without using the position of the moving lever 132.

In each of the intermediate positions between the forward punctual position and the rear punctual position, the motor 14 associated with the individual lever 132 is controlled individually by the flight control unit 18 based on the position of the individual lever 132, without using the position of the moving lever 30. The individual lever 132 is movable continuously without having to lift it.

The rear punctual position advantageously corresponds to the activation of the thrust reverser, or extinguishing of the motor.

Each additional position sensor 134 is able to determine information relative to the angular position of an associated individual lever 132 around the axis D-D', and to send this signal to the flight control unit 18.

The cooperating mechanism 136 is inserted between each pair of adjacent individual levers 132. For example, it includes a transversely retractable ball and a receptacle for the ball, respectively housed in side housings 156 across from two adjacent heads 144.

When the ball of the head 144 of a lever 132 is received in the corresponding receptacle of the head 144 of an adjacent lever 132, the levers 132 are movable jointly with one another in rotation around the axis D-D'.

The ball is able to retract when a shearing force is applied between the adjacent heads 144 of two levers 132. In this case, each of the two individual levers 132 in each intermediate position becomes rotatable again around its axis D-D', independently of the other individual lever 132.

The flight control unit 18 is able to detect that an individual lever 132 has been moved away from its forward punctual position, to activate the individual control of the motor 14 corresponding to the individual lever 132 and to adjust the speed of the motor 14, and in particular the thrust, as a function of the angular position of the individual lever 132 in each intermediate position.

Thus, the auxiliary control system 34 of the motors 14 is able to be activated by a user of the energy management device 12 when the main energy management system 32 fails. It is able to allow the individual control of each motor 14 from a corresponding individual lever 132.

Figure 7:
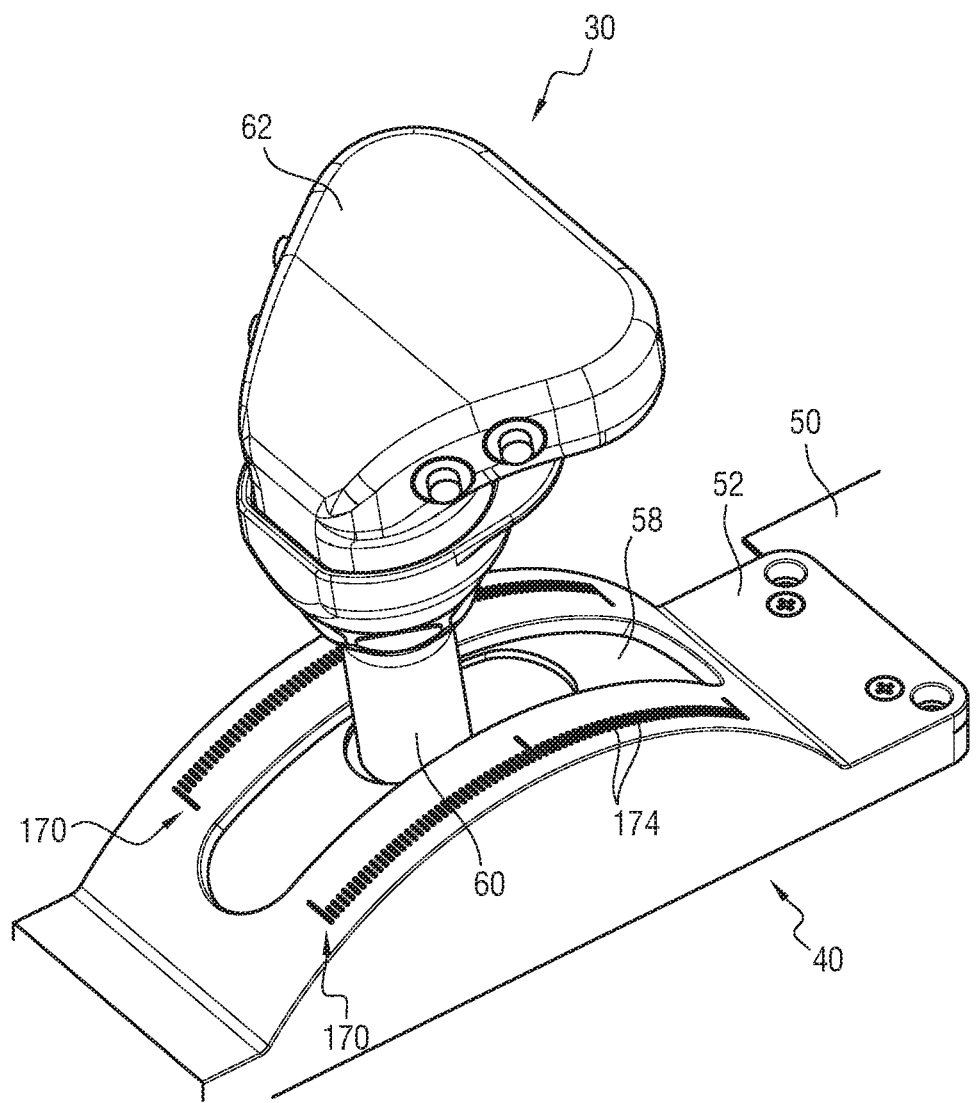
FIG. 7 shows light strips able to display light indications depending on the movement context of the aircraft.

In reference to FIGS. 7 and 8, the illuminated display system 36 includes at least one light strip 170, arranged near the centralized control lever 30, and a control unit 172 of each light strip 170, able to display at least one light indication at least at one given point of the light strip 170. The position of the or each given point is determined by the flight control unit 18 and is translated by the control unit 172 into an electrical signal to produce the light indication, based on the movement context of the aircraft 10, in particular as a function of the total mechanical energy variation of the aircraft 10, calculated at each moment by the flight control unit 18.

In the example shown in FIG. 7, the illuminated display system 36 includes two parallel light strips 170, arranged longitudinally on either side of the moving lever 30, parallel to the guide 58.

Each light strip 170 extends over at least part of the length of the guide 58, preferably over the entire travel of the centralized control lever 30 in the guide 58 between the forward extreme position and the rear extreme position.

Each light strip 170 here is formed by a series of light sources 174 arranged linearly. Each light source 174 is able to go from an off state to at least one illuminated state, preferably a plurality of illuminated states with different colors and/or intensities and/or sequences.

Advantageously, each light source 174 is formed by a light-emitting diode. Alternatively, the light sources 174 are formed on a screen. The light sources are formed directly on the screen or by backlighting on a strip light.

The strip 170 defines more than two light sources 174 corresponding to successive positions of the control lever 30 along its travel in the guide 58.

The control unit 172 of each light strip 170 is connected to the flight control unit 18 via the control unit 84 of the active force applying system 44. It is able to control each light source 174 of the light 170 between the off state and the illuminated state(s), based on the movement context of the aircraft 10, in particular based on the available mechanical energy variation for the aircraft 10.

Depending on its state, in particular its color, its intensity and/or its elimination sequence, the light source 174 provides a light indication at the point of the light strip 170 where it is situated.

Advantageously, the control unit 172 of the light strip 170 is able to display a first light indication at least at a first point of the light strip 170 via at least one first light source 174 and at least one second light indication, separate from the first light indication, at least at one second point of the strip, via at least one second light source 174 separate from the first light source 174.

The first light indication and the second light indication are colors, with different intensities and/or sequences.

The control unit 172 of the light strip 170 is able, in a first movement context of the aircraft, to place a particular light indication at least at one given point of the light strip 170, at a first light source 174, and in a second movement context of the aircraft, to place the same particular light indication at least at one other given point of the light strip, at a second source 174.

Preferably, the flight control unit 18 is able to calculate, at each moment, the position of the given point as a function of the movement context of the aircraft 10 at that moment, and to send this position to the control unit 172.

Advantageously, the control unit 172 of the light strip 170 is able to place a first light indication on a light segment 176 of the light strip 170 formed by a plurality of successive light sources 174.

The successive light sources 174 of the light segment 176 display the same light indication, for example the same color, the same intensity and/or the same light sequence.

For example, in a movement context of the aircraft 10 corresponding to a range of available mechanical energy variations calculated at each moment, the control unit 172 of the light strip 170 is able to display a first particular light indication on a light segment 176 of the light strip 170 corresponding to the range of available mechanical energy variations that can be controlled with the moving lever 30.

The light segment 176 corresponds to the possible movement of the moving lever 30 in the particular movement context of the aircraft 10, in view of the available mechanical energy variation at that moment.

Thus, the pilot not only has information about movement possibilities based on the shift in the position of the moving lever 30 along the movable neutral position, but also a visual indication of mechanical energy variations that may be achieved by actuating the moving lever 30, by visually inspecting the light strip 170.

As illustrated by FIGS. 12 to 14, the control unit 172 of the light strip 170 is able to vary the length and the position of the light segment 176 as a function of the movement context of the aircraft, and in particular as a function of the available mechanical energy variation for the aircraft 10.

Thus, the first light indication embodied by the light segment 176 in FIG. 12 moves along the light strip in FIG. 13. The length of the light segment 176 varies between FIG. 12 and FIG. 13.

The first particular light indication has its own specific color, intensity and/or light sequence, for example a green color, a constant intensity and a continuous light sequence.

Furthermore, the control unit 172 of the light strip 170 is able to display a second particular light indication arranged across from the position of a movement detent of the moving lever 30 in the guide 52.

The second particular light indication for example has a color, an intensity and/or a light sequence different from the first light indication.

For example, the control unit 172 of the light strip 170 is able to display a second particular light indication at the ends 178 of the light segment 176 having the first light indication.

Advantageously, the position of the second light indication corresponds to that of a detent or a stop generated by the control unit 84. Thus, the pilot has a dual tactile and visual indication, for example corresponding to a particular point of the range of mechanical energy variations available for the aircraft 10.

The control unit 172 of the light strip 170 is advantageously able to display a third particular light indication at a fixed point 180 of the strip, for example corresponding to the position in which the moving lever 30 reaches a mechanical stop of the stop system 48.

Advantageously, in reference to FIG. 6, the illuminated display system 36 further includes, for each individual lever 132 corresponding to a motor 14, an additional light source 190, able to generate a light indicator representative of the operating state of the motor 14.

The light indicator has a first state, for example a first color, when the motor 14 is functional, and a second state, for example a second color, when the motor 14 has a malfunction.

The additional source 190 here is housed in the axial housing 154 present on the head 144 of the lever 132. It is for example formed by a light-emitting diode.

The operation of the energy management device 12 will now be described.

Once the device 12 is activated, after turning on the motors 14, the auxiliary assembly 46 for applying a mechanical force on the centralized control lever 30 moves into its deactivated position. The rod 116 of the actuating system 114 is deployed and exerts a force on the elastic biasing member 112, separating the pads 110 from the moving lever 30.

At each moment, on the ground and during flight, the calculating module 26 of the flight control unit 18 calculates the current mechanical energy variation of the aircraft 10 and the possible mechanical energy variation range as a function of the available thrust at the motors 14, the availability of the energy modifying members 16, and movement parameters of the aircraft 10.

The calculating module 28 of the flight control unit 18 then determines the "movable neutral" position of the moving lever 30 as a function of the total mechanical energy variation of the aircraft 10 at each moment, and the total mechanical energy variation range that may be achieved by the aircraft 10 at that moment.

The active system 44 for applying a force on the moving lever 30 then receives, from the flight control unit 18, via the control unit 84, a set-point to shift the moving lever 30.

The electric motor 86 of the actuator 80 becomes activated under the effect of the control unit 84 to rotate the output shaft 88 and transmits the movement to the connecting rod 94 via the reducing gear 90 and the rotating finger 92.

The movement of the connecting rod 94 at its first end 96 is transmitted to its second end 98 at the sector 64 of the moving lever 30 to generate a force shifting the moving lever 30 that in particular depends on the position of the moving lever 30 in the guide 58. The moving lever 30 is rotated around its axis 70 to follow the position of the moving neutral.

The movement of the moving lever 30 is therefore enslaved by the flight control unit 18 in this automatic pilot mode.

Thus, the position of the moving lever 30 in the guide 58 corresponds, at each moment, to the evolution potential of the current mechanical energy variation of the aircraft 10.

When the pilot wishes to modify the mechanical energy of the aircraft 10 manually, he grasps the moving lever 30 and moves it in the guide 58. At each moment, the position sensor 42 determines the angular position of the moving lever 30 around its axis 70. This angular position is transmitted to the flight control unit 18, which develops a control signal of the propulsion motors 14 and of the energy modifying members 16 as a function of the position of the moving lever 30 detected by the position sensor 42.

Furthermore, when the pilot shifts the moving lever 30 away from its movable neutral position, the active system for applying a force 44 applies a force profile on the moving lever 30 that in particular depends on the position of the moving lever 30 in the guide 58. The electric motor 86 is controlled by the control unit 84, to transmit a movement to the reducing gear 90, the finger 92, then the connecting rod 94 and the sector 64.

The control unit 84 generates a variable force profile during the movement of the moving lever 30 around its axis 70, for example a ramp 100 having a force with an increasing intensity as a function of at least the position of the moving lever 30 in the guide 58 when the moving lever 30 moves toward the forward extreme position (see FIG. 9), a stable detent 102 around a given position P1 between the rear extreme position and the forward extreme position (see FIG. 10) and/or an unstable detent 104 around the position P1 (see FIG. 11).

Thus, the pilot is guided at all times in actuating the moving lever 30, and can intuitively anticipate the operating bounds in terms of available energy on the aircraft 10.

Once the lever 30 is positioned at the desired mechanical energy variation setpoint by the pilot, a new movable neutral position corresponding to this in-flight mechanical energy variation is determined by the control module 28 at each moment.

The pilot can also keep the lever 30 in position against a set-point from the automatic piloting system seeking to move it to adjust the position of the movable neutral.

In case of power failure of the active system 44 for applying a force, the actuating system 114 is no longer supplied with electricity. The rod 116 retracts and the elastic biasing member 112 returns each pad 110 to its position engaged on the moving lever 30.

Each pad 110 then exerts a mechanical force on the sector 64 of the moving lever 30 to keep the moving lever 30 in a stable position, without interaction by the pilot with the moving lever 30. Furthermore, when the pilot grasps the moving lever 30, the mechanical force exerted by the pads 110 on the moving lever 30 can be overcome, while ensuring precise guiding of the moving lever 30 during its movement in the guide 58. The position information of the moving lever 30 then remains available for the flight control unit 18.

During the normal operation of the moving lever 30, the individual levers 132 of the auxiliary energy management system 34 are kept in their idle positions, here in their forward punctual positions.

In case of incident preventing the maneuvering of the moving lever 30, for example in case of mechanical blocking of the moving lever 30, the pilot lifts each individual lever 132 on its axis, then rotates it toward the rear to pass the stop. The passage of the stop activates the auxiliary energy management system 34.

Advantageously, this movement is obtained by sliding the pilot's fingers below the hook-shaped ends of the fingers 152 of each head 144 of the levers 132.

Then, the pilot moves each individual lever 132 from its forward punctual position to an intermediate setpoint position.

By default, the cooperation mechanism 136 between the individual levers 132 is active, such that the individual levers 132 move jointly with one another. Alternatively, when the pilot wishes to control each of the motors 14 of the aircraft individually, for example when one of the motors fails, he deactivates the cooperation mechanism 136 and actuates each lever 132 individually by giving it its own position.

Said auxiliary energy management system 34 is therefore suitable for supplementing a failure of the main energy management system 32 and allows the pilot to control each motor 14 of the aircraft 10 individually. The energy management device 12 therefore provides redundancy for functions in terms of the propulsion of the aircraft 10.

Simultaneously, based on a set-point given by the flight control unit 18, the control unit 172 of the light strip 170 places at least one light indication at least at one given point of the light strip 170 calculated at each moment by the control unit 172 based on the movement context of the aircraft 10, in particular as a function of the total mechanical energy of the aircraft 10.

Advantageously, the control unit 172 of the light strip 170 places a particular light indication on a light segment 176 of the light strip 170 formed by a plurality of successive light sources 174. The successive light sources 174 of the light segment 176 preferably display the same light indication, for example the same color, the same intensity and/or the same light sequence.

As illustrated in FIGS. 12 to 14, in a movement context of the aircraft 10 corresponding to an available mechanical energy variation calculated at each moment, the control unit 172 of the light strip 170 displays a first particular light indication on a light segment 176 of the light strip 170 corresponding to the range of available mechanical energy variations that can be controlled with the moving lever 30.

The control unit 172 of the light strip 170 varies the length (see FIG. 14) and the position (see FIG. 13) of the light segment 176 as a function of the movement context of the aircraft 10, and in particular as a function of the available mechanical energy variation for the aircraft 10.

The first particular light indication has its own specific color, intensity and/or light sequence, for example a green color, a constant intensity and a continuous light sequence.

Furthermore, the control unit 172 of the light strip 170 displays a second particular light indication across from the position of a movement detent of the centralized control lever 30 in the guide 52.

The second particular light indication has a color, an intensity and/or a light sequence different from the first light indication.

For example, the control unit 172 of the light strip 170 displays a second particular light indication at the ends 178 of the light segment 176 having the first particular light indication.

The control unit 172 of the light strip 170 advantageously displays a third particular light indication at a fixed point 180 of the strip, for example corresponding to the position in which the moving lever 30 reaches a mechanical stop of the stop system 48.

Thus, at any moment, the pilot views the movement range at his disposal with the moving lever 30, corresponding to the mechanical energy variation achievable by the aircraft 10, using the first light indication displayed on the entire light segment 176.

The pilot further views the bounds of the movement of the moving lever 30 owing to the second light indication, displayed at the ends 178 of the light segment 176.

Lastly, the pilot advantageously views the position of a mechanical stop owing to the third light indication displayed in the fixed position 180 of this stop.

The length and the position of the light segment 176 forming the first light indication, and the position of its ends 178, forming the second light indication, is able to evolve over time, as a function of the movement context of the aircraft 10, and particularly as a function of the available mechanical energy variation for the aircraft 10.

The display system 36 is therefore particularly useful for the pilot of the aircraft 10, to perceive the energy available for the aircraft 10.

In one particular operating mode of the device 12, an optimized mechanical energy variation value of the aircraft 10 is indicated to the pilot based on the movement phase of the aircraft 10.

For example, when the aircraft 10 prepares for takeoff, an optimized mechanical energy variation value (here corresponding to an optimal thrust) is determined by the flight control unit 18, in particular as a function of the mass of the aircraft 10 and the length of the runway. A particular light indication is displayed on a point of the light strip 170 by the control unit 172 across from the position of the lever 30 corresponding to the optimized mechanical energy variation set point. Likewise, the control unit 84 advantageously generates a particular force profile in this position of the lever 30, for example a detent.

In one alternative, the movable neutral position is not necessarily determined as a function of the available mechanical energy variation for the aircraft 10.

In one embodiment, all of the motors 14 and the mechanical energy modifying members 16 are able to be controlled jointly by the flight control unit 18 as a function of the position of the moving lever 30.

Alternatively, for a single-engine aircraft 10 or when a motor 14 of the aircraft 10 has been turned off (for example, using an individual lever 132), the active motor 10 and the mechanical energy modifying members 16 are able to be controlled jointly by the flight control unit 18 as a function of the position information of the moving lever 30.

In one alternative, the energy management device 12 has no primary energy management system 32 provided with an active system 44 for applying a force and/or has no auxiliary energy management system 34.

In one alternative, the device 12 is an automatic throttle whereof the or each lever exclusively pilots the thrust of one engine of the aircraft.

In this case, the automatic throttle jointly pilots at least two propulsion motors 14 forming at least two mechanical energy variation sources from among a plurality of energy variation sources comprising the propulsion motors 14 and the mechanical energy modification members 16 present on the aircraft. The mechanical energy modification members 16 are piloted manually by the pilot and not by the automatic throttle.

What is claimed is:

1. A device for managing the mechanical energy of an aircraft, the device being configured for placement in a cockpit of the aircraft and comprising:
   a support defining a guide;
   at least one control lever configured for controlling a mechanical energy variation of the aircraft, mounted movably through the guide;
   at least one position sensor configured for detecting a position of the control lever in the guide, the at least one position sensor being configured to create position information for the position of the control lever in the guide for sending to a flight control unit of the aircraft;
   at least one light strip extending on the support along at least part of a movement travel of the control lever in the guide; and
   a light strip control unit of the at least one light strip, the light strip control unit being configured for displaying at least one light indication at least at one given point of the at least one light strip calculated as a function of a movement context of the aircraft,
   wherein the light strip control unit is configured for controlling the display of the light indication across from a force change in the movement travel of the control lever in the guide, the force change being a change in a force applied on the control lever by a component of an energy management system when a user moves the control lever.

2. The device according to claim 1, wherein the light strip control unit is configured to display a first light indication at a first point of the at least one light strip and at least one second light indication, separate from the first light indication, at a second point of the at least one light strip.

3. The device according to claim 2, wherein the first light indication and the second light indication are with different colors, intensities or sequences.

4. The device according to claim 1, wherein the light strip control unit is configured, in a first movement context of the aircraft, to place the light indication at least at one given point of the at least one light strip, and in a second movement context of the aircraft, to place the light indication at least at one other given point of the at least one light strip.

5. The device according to claim 1, wherein the movement context of the aircraft comprises the mechanical energy variation of the aircraft.

6. The device according to claim 1, wherein the force change is a detent and/or a stop in the movement travel of the control lever in the guide.

7. The device according to claim 1, wherein the light indication extends over a segment of the at least one light strip comprising the given point.

8. The device according to claim 1, wherein the at least one light strip extends along the guide parallel to the guide.

9. The device according to claim 1, wherein the at least one light strip comprises a plurality of successive light sources, each light source being controlled individually by the light strip control unit of the at least one light strip.

10. An aircraft, comprising:
the device according to claim 1;
a plurality of sources configured for varying the mechanical energy of the aircraft comprising at least one propulsion motor and at least one member configured for modifying the mechanical energy of the aircraft; and
the flight control unit,
the position sensor configured for detecting the position of the control lever being connected to the flight control unit, the flight control unit being configured to pilot the at least one propulsion motor and/or the at least one member configured for modifying the mechanical energy based on the position information of the control lever in the guide.

11. The aircraft according to claim 10, wherein the flight control unit is configured to calculate, at each moment, the position of the given point as a function of the movement context of the aircraft at that moment, and to send the calculated position to the light strip control unit.

12. The aircraft according to claim 11, wherein the control lever is a centralized control lever configured to jointly pilot at least two mechanical energy variation sources of the aircraft from among the plurality of mechanical energy variation sources of the aircraft as a function of the position information of the centralized control lever in the guide, the movement context of the aircraft comprising the mechanical energy variation of the aircraft.

13. A control method for an aircraft, comprising:
providing the device according to claim 1;
calculating the position of a given display point of the light indication on the at least one light strip as a function of a movement context of the aircraft; and
displaying, via the light strip control unit, the light indication at least at the calculated given display point of the at least one light strip.

14. The method according to claim 13, comprising the display, by the light strip control unit, of a first light indication at a first point of the at least one light strip and the display, by the light strip control unit, of at least one second light indication, separate from the first light indication, at a second point of the at least one light strip.

15. The method according to claim 13, comprising, in a first movement context of the aircraft, placing the light indication at least at one given point of the at least one light strip, and in a second movement context of the aircraft, placing the light indication at least at one other given point of the at least one light strip.

16. The device according to claim 1, wherein the component of the energy management system applying the force change is an actuator.

17. The device according to claim 1, wherein the component of the energy management system applying the force change is a mechanical stop.

18. A device for managing the mechanical energy of an aircraft, intended to be placed in a cockpit of the aircraft, comprising:
a support defining a guide;
at least one control lever configured for controlling a mechanical energy variation of the aircraft, mounted movably through the guide;
at least one position sensor configured for detecting a position of the control lever in the guide, the at least one position sensor being configured to create position information for the position of the control lever in the guide for sending to a flight control unit of the aircraft;
at least one light strip extending on the support along at least part of a movement travel of the control lever in the guide; and
a light strip control unit of the at least one light strip, the light strip control unit being configured for displaying at least one light indication at least at one given point of the at least one light strip calculated as a function of a movement context of the aircraft,
wherein in a movement context of the aircraft corresponding to a range of available mechanical energy variations calculated at each moment, the control unit of the light strip is configured to display a first particular light indication on a light segment of the light strip corresponding to the range of available mechanical energy variations that are controllable with the control lever.

19. An aircraft, comprising:
a plurality of sources configured for varying the mechanical energy of the aircraft comprising at least one propulsion motor and at least one member configured for modifying the mechanical energy of the aircraft;
a flight control unit; and
a device for managing the mechanical energy of an aircraft, configured to be placed in a cockpit of the aircraft, the device comprising:
a support defining a guide;
at least one control lever for controlling a mechanical energy variation of the aircraft, mounted movably through the guide;
at least one position sensor configured for detecting a position of the control lever in the guide, the at least one position sensor being configured to create position information for the position of the control lever in the guide for sending to the flight control unit of the aircraft;
at least one light strip extending on the support along at least part of a movement travel of the control lever in the guide;
a light strip control unit of the at least one light strip, the light strip control unit being configured for displaying at least one light indication at least at one given point of the at least one light strip calculated as a function of a movement context of the aircraft, the at least one position sensor being connected to the flight control unit, the flight control unit being configured to pilot the at least one propulsion motor and/or the at least one member for modifying the mechanical energy of the aircraft based on the position information of the control lever in the guide.

* * * * *